(12) United States Patent
Rees et al.

(10) Patent No.: US 8,813,430 B2
(45) Date of Patent: Aug. 26, 2014

(54) PLATFORM WITH ADJUSTABLE SUPPORT MEMBERS

(75) Inventors: Joseph W. Rees, St. Louis, MO (US); Robert Erik Grip, Rancho Palos Verdes, CA (US); Christopher K. Droney, Long Beach, CA (US); Deborah Ann Beron-Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 7 days.

(21) Appl. No.: 13/544,489

(22) Filed: Jul. 9, 2012

(65) Prior Publication Data

US 2014/0007797 A1    Jan. 9, 2014

(51) Int. Cl.
*E04H 3/26* (2006.01)
*E04H 3/12* (2006.01)
*A47B 3/08* (2006.01)

(52) U.S. Cl.
CPC .............. *E04H 3/126* (2013.01); *A47B 3/0803* (2013.01)
USPC ................................................. 52/7; 52/126.1

(58) Field of Classification Search
USPC .................... 52/7, 126.1, 126.4, 126.5, 126.6; 108/115, 169, 174, 171; 248/188, 248/188.2, 188.6
See application file for complete search history.

(56) References Cited

U.S. PATENT DOCUMENTS

| | | | | |
|---|---|---|---|---|
| 544,821 A | | 8/1895 | Morrison | |
| 1,567,175 A | * | 12/1925 | Basford | 108/176 |
| 1,576,635 A | * | 3/1926 | Douglas | 108/160 |
| 1,630,851 A | * | 5/1927 | Koehn | 108/125 |
| 1,644,133 A | * | 10/1927 | Howe | 108/129 |
| 1,683,579 A | * | 9/1928 | Page et al. | 108/125 |
| 1,882,939 A | * | 10/1932 | Root | 108/125 |
| 3,100,624 A | * | 8/1963 | Spiselman | 254/101 |
| 3,470,663 A | * | 10/1969 | Tate | 52/126.6 |
| 3,995,760 A | | 12/1976 | Burgdorf et al. | |
| 4,098,535 A | | 7/1978 | Berger | |
| 4,124,119 A | | 11/1978 | Nordstrom | |
| 4,319,520 A | * | 3/1982 | Lanting et al. | 454/290 |
| 4,870,789 A | * | 10/1989 | Clark et al. | 52/126.6 |
| 5,477,649 A | * | 12/1995 | Bessert | 52/263 |
| 5,755,163 A | | 5/1998 | Coats | |
| 5,848,507 A | * | 12/1998 | Bozich | 52/299 |
| 5,868,081 A | | 2/1999 | Raab | |
| 6,101,768 A | * | 8/2000 | Springstead et al. | 52/126.6 |
| 6,381,907 B1 | * | 5/2002 | MacKarvich | 52/126.6 |
| 7,055,563 B2 | | 6/2006 | Logan | |
| 7,258,231 B1 | | 8/2007 | Wertz et al. | |
| 2011/0198153 A1 | | 8/2011 | Dufour et al. | |
| 2013/0055647 A1 | * | 3/2013 | Favell | 52/7 |

FOREIGN PATENT DOCUMENTS

DE        2420603 A1    11/1975

OTHER PUBLICATIONS

PCT Search Report dated Jan. 7, 2014 regarding Application No. PCT/US2013/U44489, 76 pages.

* cited by examiner

*Primary Examiner* — Basil Katcheves
(74) *Attorney, Agent, or Firm* — Yee & Associates, P.C.

(57) ABSTRACT

A method and apparatus for forming a platform. In one embodiment, the apparatus comprises a set of support members associated with the structure, and a set of adjustment members. An adjustment member in the set of adjustment members is associated with a corresponding support member in the set of support members. The adjustment member is configured to adjust an angle between the corresponding support member and the structure.

20 Claims, 15 Drawing Sheets

FIG. 4

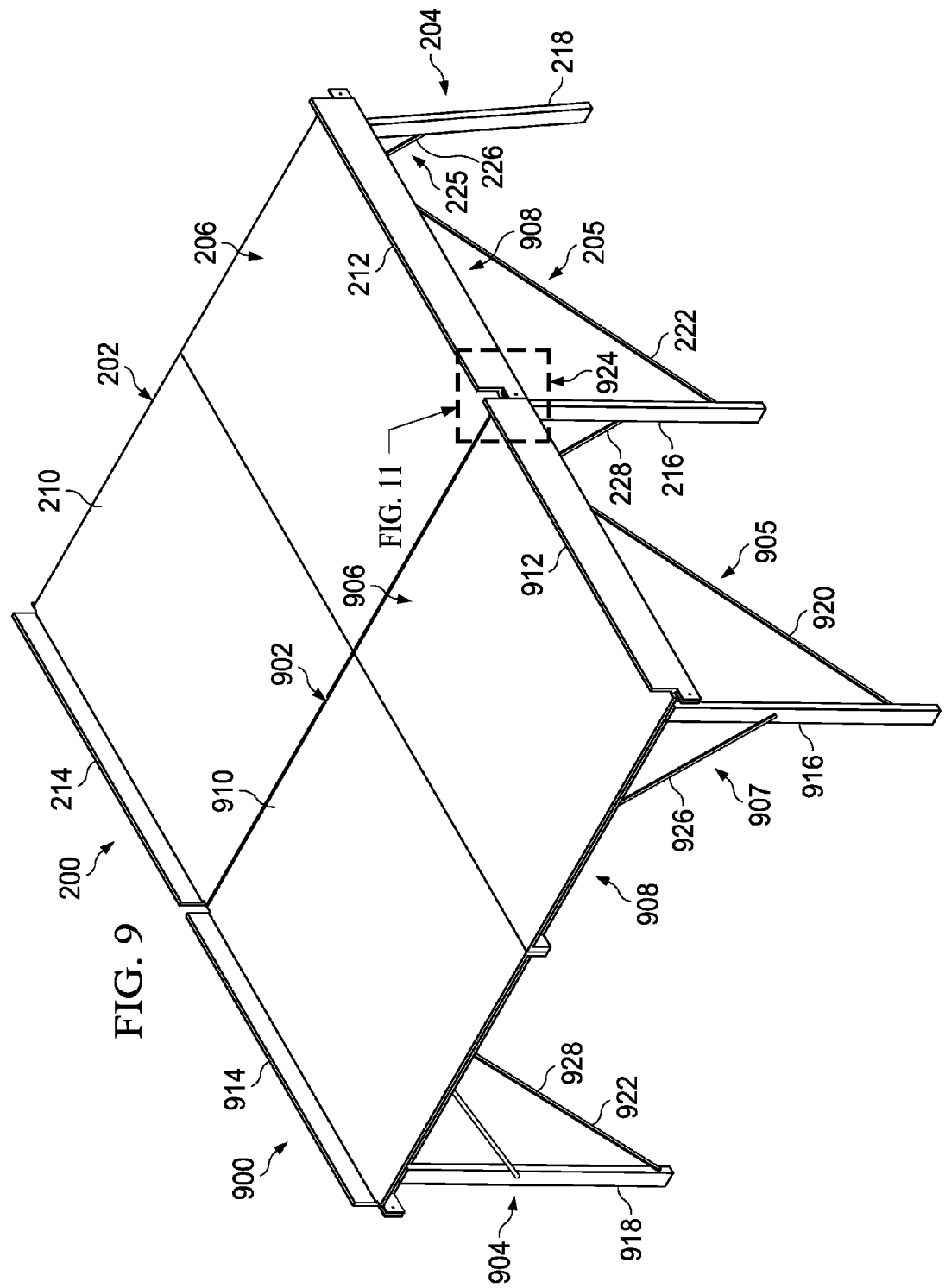

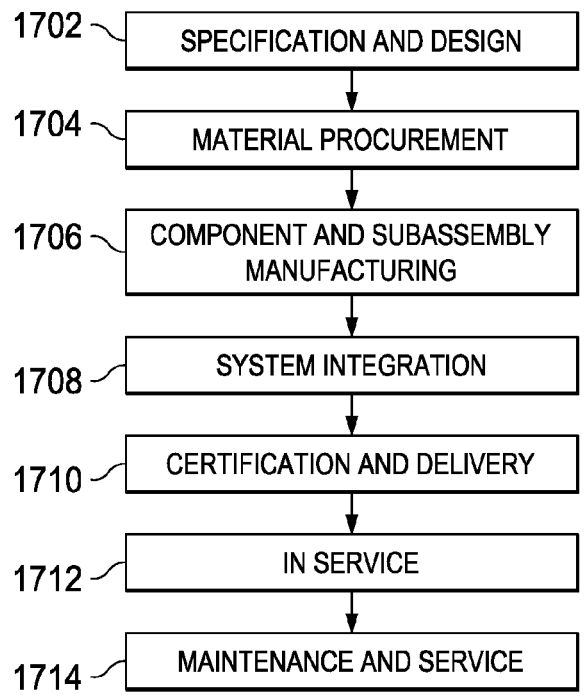
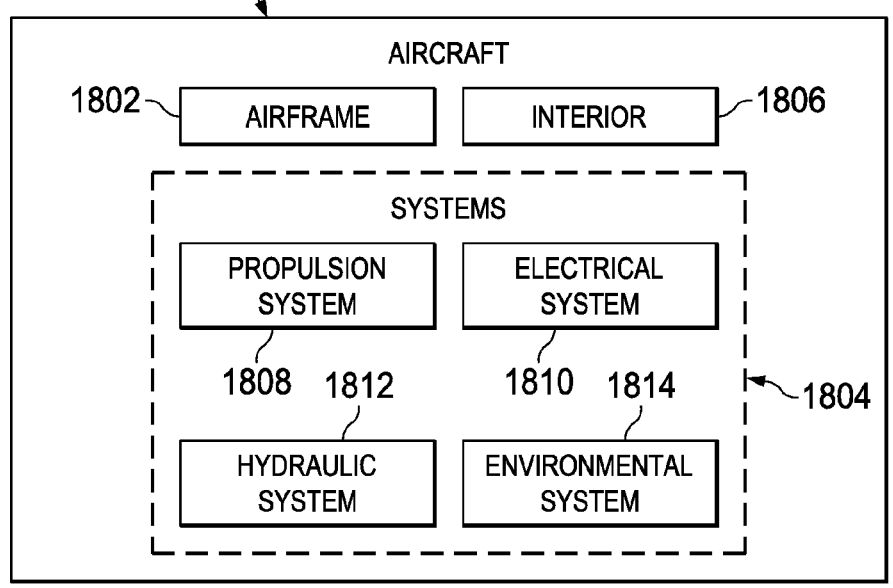

PLATFORM WITH ADJUSTABLE SUPPORT MEMBERS

BACKGROUND INFORMATION

1. Field

The present disclosure relates generally to platforms, and in particular, to a platform having adjustable supports. Still more particularly, the present disclosure relates to a platform having supports that may be adjusted for attachment to fastening elements on a surface that are variably-spaced.

2. Background

Transport aircraft may be used to perform different types of missions. The different types of missions that may be performed by a transport aircraft may include, for example, without limitation, a cargo transport mission, a personnel transport mission, a rescue mission, a supply delivery mission, one or more other types of missions, or some combination thereof. As one illustrative example, a military transport aircraft may be used to transport military troops, military equipment, weapons, medical supplies, food supplies, and/or other types of cargo.

In some cases, the amount of cargo and/or the number of personnel that can be transported by a transport aircraft may be limited by the space inside the transport aircraft, and in particular, the space inside the fuselage of the transport aircraft. More specifically, the amount of cargo and/or the number of personnel that can be transported by a transport aircraft may be limited by the area of the floor inside the fuselage of the aircraft.

The space limitations inside a transport aircraft may increase costs and/or the time needed to perform certain types of missions more than desired. For example, a particular mission may require that a selected amount of cargo be transported from a starting location to an end location using a transport aircraft. However, space limitations inside the transport aircraft may allow only a portion of the selected amount of cargo to be transported during each trip between the starting location and the end location. Consequently, a greater number of trips between these two locations may be needed to complete the mission. These additional trips may increase the cost of the mission and the time needed to complete the mission more than desired.

Additionally, the number of personnel that may be transported in a transport aircraft may depend on the existing floor area inside the fuselage of the transport aircraft available for seating. Some currently available transport aircraft may be unable to accommodate seating for more than a selected number of passengers. Further, some currently available seating solutions for increasing seating may include adding rows of seats that extend down the length of the fuselage or rows of seats that extend across the width of the fuselage.

However, these types of seating configurations may cause overcrowding. Further, these types of seating configurations may not increase the amount of seating available for passengers as much as desired. Therefore, it would be desirable to have a method and apparatus that takes into account at least some of the issues discussed above, as well as other possible issues.

SUMMARY

In one illustrative embodiment, an apparatus comprises a structure, a set of support members associated with the structure, and a set of adjustment members. An adjustment member in the set of adjustment members is associated with a corresponding support member in the set of support members. The adjustment member is configured to adjust an angle between the corresponding support member and the structure.

In another illustrative embodiment, a platform comprises a group of modular units connected to each other and a platform surface. Each modular unit in the group of modular units comprises a structure, a set of support members associated with the structure, and a set of adjustment members. An adjustment member in the set of adjustment members is associated with a corresponding support member in the set of support members. The adjustment member is configured to adjust an angle between the corresponding support member and the structure. The platform surface is formed by the group of modular units and is substantially planar within selected tolerances.

In yet another illustrative embodiment, a method for assembling a platform is provided. A modular unit is positioned relative to an environment surface of an environment. The modular unit comprises a structure, a set of support members associated with the structure, and a set of adjustment members. An angle is adjusted between a support member in the set of support members and the structure using an adjustment member in the set of adjustment members associated with the support member. The support member is attached to the environment surface of the environment.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of a top isometric view of two modular units connected to each other in accordance with an illustrative embodiment;

FIG. 17 is an illustration of an aircraft manufacturing and service method in accordance with an illustrative embodiment; and FIG. 18 is an illustration of an aircraft in the form of a block diagram in accordance with an illustrative embodiment.

DETAILED DESCRIPTION

Figure 1:
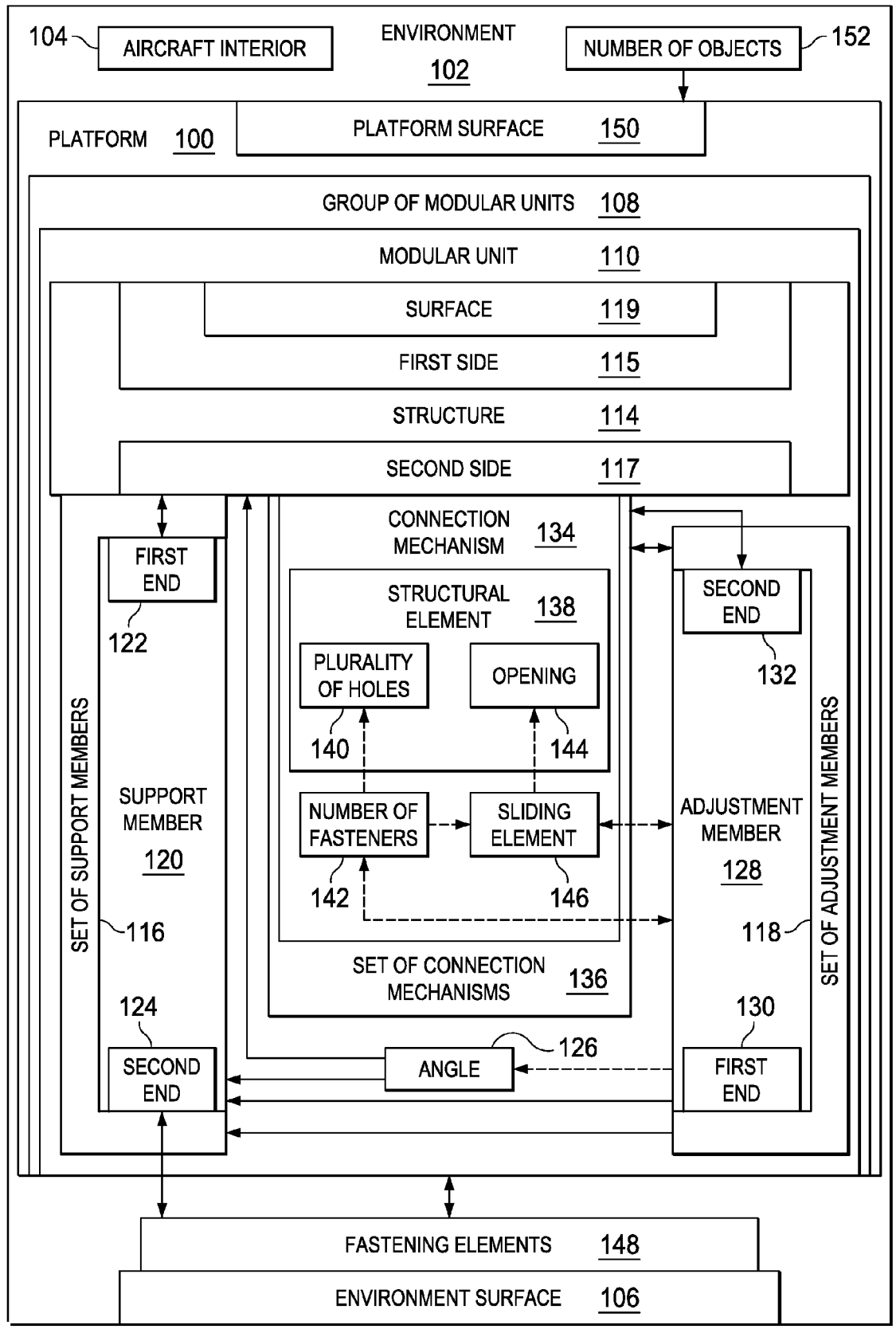
FIG. 1 is an illustration of a platform in the form of a block diagram in accordance with an illustrative embodiment.

The different illustrative embodiments recognize and take into account different considerations. For example, the different illustrative embodiments recognize and take into account that it may be desirable to use a platform that functions as a second floor inside the fuselage of a transport aircraft. This second floor can be used to increase the space available for transporting cargo and/or personnel.

In particular, a platform may be used to create a second floor over the floor already present inside the fuselage of the transport aircraft. As one illustrative example, a platform may have a structure supported by one or more supports, or "legs". These supports are used to raise the structure off of the floor inside the fuselage of the transport aircraft. The structure may have a platform surface that forms a second floor inside the fuselage when the structure is raised off of the floor inside the fuselage of the transport aircraft.

The illustrative embodiments also recognize and take into account that it may be desirable to have a platform comprised of modular units assembled together in a row. As used herein, a "modular unit" is a standardized unit. In other words, each of the modular units used to form the platform would have a similar configuration or same configuration. Each of these modular units may be configured to attach to one or more other modular units.

Additionally, the illustrative embodiments recognize and take into account that some transport aircraft have fastening elements already present on the floor. For example, certain types of military transport aircraft have tie-down rings already present on the floor inside the fuselage. These tie-down rings are typically used for securing cargo, pallets, storage containers, passenger seats, and other types of objects.

The illustrative embodiments recognize and take into account that these fastening elements may be used to secure the modular units that form the platform to the floor inside the fuselage of the transport aircraft. However, the different illustrative embodiments also recognize and take into account that these fastening elements may not be equally spaced in some types of transport aircraft.

As one illustrative example, the fastening elements in a military transport aircraft may be equally spaced across the width of the fuselage of the aircraft but unequally spaced along the length of the fuselage. Unequal spacing along the width of the fuselage, the length of the fuselage, or both the width of the fuselage and the length of the fuselage may be referred to as variable spacing. The different illustrative embodiments recognize and take into account that attaching the ends of the supports of the modular units to fastening elements that are variably spaced may not be possible when the supports attached to the structures that make up these modular units are not moveable.

Thus, the different illustrative embodiments provide a method and apparatus configured to provide a platform that functions as an additional surface above a pre-existing surface within an environment. In particular, the different illustrative embodiments provide a platform that has adjustable supports. These supports may be adjusted such that the ends of the supports can be attached to fastening elements, such as tie-down rings, that are variably spaced on the surface within the same environment.

With reference now to FIG. 1, an illustration of a platform in the form of a block diagram is depicted in accordance with an illustrative embodiment. In these illustrative examples, platform 100 may be configured for use in environment 102. Environment 102 may be any environment in which an additional surface is needed.

For example, environment 102 may be selected from one of, but is not limited to, an interior of an aircraft, an interior of a ship, an interior of a space shuttle, an area on a deck of a ship, a storage space, an interior of a container, or some other type of mobile or stationary environment. In one illustrative example, environment 102 takes the form of aircraft interior 104. In this illustrative example, aircraft interior 104 is the interior of a fuselage of a transport aircraft.

Platform 100 may be used to create an additional surface above environment surface 106 of environment 102. In some illustrative examples, environment surface 106 of environment 102 is the floor or ground surface of environment 102. For example, when environment 102 is aircraft interior 104, environment surface 106 is the floor of aircraft interior 104. In these illustrative examples, environment surface 106 is substantially planar. In other words, environment surface 106 may be substantially level.

In these illustrative examples, platform 100 comprises group of modular units 108. Group of modular units 108 have been assembled together to form platform 100. As used herein, a "group of" items means one or more items. For example, group of modular units 108 means one or more modular units.

Each modular unit in group of modular units 108 has a similar or same configuration. Of course, in other illustrative examples, one or more of the modular units in group of modular units 108 may have different features or a different configuration from one or more other modular units in group of modular units 108.

In these illustrative examples, each modular unit in group of modular units 108 comprises a structure supported by a set of support members and a set of adjustment members. As used herein, a "set of" items means one or more items. For example, a set of support members is one or more support members and a set of adjustment members is one or more adjustment members.

In some cases, the number of support members in the set of support members for a modular unit may be different than the number of support members in the set of support members for a different modular unit. Similarly, in some cases, the number of adjustment members in the set of adjustment members for a modular unit may be different than the number of adjustment members in the set of adjustment members for a different modular unit.

Modular unit 110 is an example of a modular unit in group of modular units 108. As depicted, modular unit 110 comprises structure 114, set of support members 116, and set of adjustment members 118. Structure 114 may be comprised of one or more structural elements. These structural elements may include, for example, without limitation, any number of plates, panels, beams, rods, struts, flanges, elongate structures, and/or other types of structural elements.

Structure 114 has first side 115 and second side 117. Surface 119 of structure 114 at first side 115 of structure 114 may be substantially planar in these illustrative examples. In other words, surface 119 may be substantially flat.

As used herein, a "support member", such as a support member in set of support members 116, is a support for structure 114. A support member may also be referred to as a "leg". A support member may have a cylindrical shape, a prism shape, or some other type of shape.

Set of support members 116 is associated with structure 114. In particular, each support member in set of support members 116 is associated with structure 114. Support member 120 is an example of one of set of support members 116. Support member 120 is associated with structure 114. As used herein, when one component is "associated" with another component, the association is a physical association.

For example, a first component, such as support member 120, may be considered to be associated with a second component, such as structure 114, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Further, when a first component is "connected to" a second component, the first component may be connected directly or indirectly to the second component. In other words, additional components may be present between the first component and the second component. The first component may be considered to be indirectly connected to the second component when one or more additional components are present between the two components. The first component may be considered to be directly connected to the second component when no additional components are present between the two components.

In these illustrative examples, set of support members 116 may be moveably associated with structure 114. As used herein, a first component that is "moveably connected" to a second component may be allowed to move relative to the second component. For example, support member 120 may be moveably associated with structure 114 such that support member 120 may move relative to structure 114.

As depicted, support member 120 has first end 122 and second end 124. In one illustrative example, first end 122 of support member 120 is moveably connected to second side 117 of structure 114. This connection may be formed in a number of different ways. For example, without limitation, a hinge joint, a spherical joint, a ball bearing joint, and/or some other suitable type of joint may be used to connect first end 122 of support member 120 to structure 114.

In one illustrative example, support member 120 is connected to structure 114 in a manner that allows support member 120 to rotate about an axis at first end 122 of support member 120, relative to structure 114. In other words, support member 120 is connected to structure 114 with one degree of rotational freedom. Of course, depending on the implementation, the amount of rotation by support member 120 relative to structure 114 may be constrained.

In another illustrative example, support member 120 is connected to structure 114 in a manner that allows support member 120 to rotate about two axes at first end 122 of support member 120. In other words, support member 120 is connected to structure 114 with two degrees of rotational freedom. Of course, depending on the implementation, the amount of rotation by support member 120 relative to structure 114 may be constrained.

In these illustrative examples, support member 120 may be connected to structure 114 at angle 126. Angle 126 may be defined as the angle between a vertical axis through support member 120 and a plane through support member 120. Support member 120 may be moveably connected to structure 114 such that angle 126 may be adjusted.

Further, in these illustrative examples, support member 120 is removably connected to second side 117 of structure 114. In other words, support member 120 may be detached and reattached to structure 114 at any point in time.

As depicted, set of adjustment members 118 is associated with set of support members 116. In one illustrative example, each adjustment member in set of adjustment members 118 is associated with a corresponding support member in set of support members 116. Of course, in other illustrative examples, set of adjustment members 118 may comprise a single adjustment member associated with more than one support member in set of support members 116.

Adjustment member 128 is an example of one of set of adjustment members 118. In some cases, adjustment member 128 may take the form of a brace or some other type of elongate member or elongate structure. Adjustment member 128 is associated with a corresponding support member, which is support member 120 in this illustrative example. Adjustment member 128 is configured to adjust angle 126 between support member 120 and structure 114.

As depicted, adjustment member 128 has first end 130 and second end 132. First end 130 of adjustment member 128 is connected to support member 120. In some cases, first end 130 of adjustment member 128 is connected to second end 124 of support member 120. In other examples, first end 130 of adjustment member 128 is connected to support member 120 between first end 122 and second end 124 of support member 120.

In these illustrative examples, second end 132 of adjustment member 128 is connected to second side 117 of structure 114. In particular, second end 132 of adjustment member 128 is connected to second side 117 of structure 114 using connection mechanism 134. Connection mechanism 134 is one of set of connection mechanisms 136. Each connection mechanism in set of connection mechanisms 136 is configured to connect a corresponding adjustment member in set of adjustment members 118 to structure 114.

Connection mechanism 134 may be implemented in a number of different ways. In one illustrative example, connection mechanism 134 may comprise structural element 138 having plurality of holes 140 and number of fasteners 142. As used herein, a "plurality of" items means two or more items. For example, plurality of holes 140 means two or more holes. Further, as used herein, a "number of" items means one or more items. For example, number of fasteners 142 may be one or more items.

Structural element 138 is associated with structure 114 on second side 117 of structure 114. In some cases, structural element 138 is considered part of structure 114, while in other cases, structural element 138 is considered separate from structure 114.

Number of fasteners 142 may be used to connect second end 132 of adjustment member 128 to second side 117 of structure 114 using one of plurality of holes 140. Each hole in plurality of holes 140 may correspond to a different value for angle 126 between support member 120 and structure 114. In other words, changing which hole in plurality of holes 140 through which adjustment member 128 is connected to structure 114 changes angle 126 between support member 120 and structure 114.

In some illustrative examples, structural element 138 may have opening 144 instead of plurality of holes 140. Further, connection mechanism 134 may also include sliding element 146 in these examples. Number of fasteners 142 may be used to connect second end 132 of adjustment member 128 to sliding element 146. Sliding element 146 may be configured to move in a direction along an axis through opening 144.

The position of sliding element 146 within opening 144 determines the value of angle 126 between support member 120 and structure 114. In other words, moving sliding element 146 within opening 144 along the axis through opening 144 changes angle 126 between support member 120 and structure 114.

In these illustrative examples, modular unit 110 may be positioned over environment surface 106 of environment 102. The set of second ends of set of support members 116 may be attached to at least a portion of fastening elements 148 on environment surface 106 to secure modular unit 110 to environment surface 106. For example, second end 124 of support member 120 may be configured to be attached to a corresponding fastening element of fastening elements 148 on environment surface 106. Fastening elements 148 may comprise any number of different types of fastening elements. In one illustrative example, fastening elements 148 take the form of tie-down rings.

Fastening elements 148 may be associated with environment surface 106. For example, without limitation, fastening elements 148 may be attached to environment surface 106 at predefined locations. In some cases, fastening elements 148 may be part of environment surface 106 located at predefined locations on environment surface 106.

In some cases, fastening elements 148 are variably spaced on environment surface 106. For example, fastening elements 148 may be arranged on environment surface 106 in the form of a grid. However, while fastening elements 148 may be equally spaced with respect to the width of environment surface 106, fastening elements 148 may be unequally spaced with respect to the length of environment surface 106. For example, when environment 102 is aircraft interior 104, fastening elements 148 may be equally spaced across the width of aircraft interior 104 but unequally spaced along the length of aircraft interior 104.

When modular unit 110 is attached to environment surface 106, set of adjustment members 118 may be used to adjust the angle between one or more support members in set of support members 116 and structure 114. Adjusting these angles changes the position of the set of second ends of these support members.

For example, connection mechanism 134 may be used to change the connection between second end 132 of adjustment member 128 and second side 117 of structure 114. Changing this connection changes angle 126 between support member 120 and structure 114, thereby changing the position of second end 124 of support member 120. The position of second end 124 of support member 120 may be changed such that second end 124 may be attached to one of fastening elements 148.

In this manner, the set of adjustment members for each modular unit in group of modular units 108 may be used to adjust the angle between one or more of the set of support members for each modular unit and the structure for each modular unit. These angles may be adjusted to accommodate the variably spaced fastening elements 148 on environment surface 106 of environment 102.

Group of modular units 108 may be attached to fastening elements 148 on environment surface 106 to form platform 100. Platform 100 has platform surface 150. In these illustrative examples, platform surface 150 is substantially planar within selected tolerances. In some cases, the surface of the structure for each modular unit used to form platform 100 may be angled relative to the surfaces of the other structures for the other modular units to form platform 100 after attachment to fastening elements 148. However, the overall platform surface 150 formed by group of modular units 108 is substantially planar within selected tolerances.

For example, when adjustment member 128 in set of adjustment members 118 for modular unit 110 is used to adjust angle 126 between support member 120 and structure 114, structure 114 may be angled relative to environment surface 106 in some cases. In particular, surface 119 of structure 114 may have an angular offset from environment surface 106. However, in these illustrative examples, this angular offset may be within selected tolerances such that structure 114 may be considered substantially parallel to or level with respect to environment surface 106.

Consequently, when the set of adjustment members for each modular unit in group of modular units 108 is used to adjust the angle between one or more of the set of support members for each modular unit and the structure for each modular unit, the surface of the structure for each modular unit may have an angular offset from environmental surface 106. However, these angular offsets may be within selected tolerances such that platform surface 150 formed by connecting group of modular units 108 together is substantially planar and substantially parallel to environment surface 106 within selected tolerances.

Platform surface 150 provides an additional surface in environment 102 that is functional. For example, platform surface 150 may be used to support number of objects 152 placed on platform surface 150. Number of objects 152 may include, for example, without limitation, a number of seats, a number of storage containers, a number of pallets, and/or or a number of other types of objects.

In this manner, the different illustrative embodiments provide an additional surface in aircraft interior 104 using platform 100. This additional surface may be used for creating additional seating for passengers and for storing additional cargo. Platform 100 provides this additional surface without requiring changes to the structure and/or configuration of aircraft interior 104.

In some cases, platform 100 may be configured for use in more than one environment. For example, the length of platform 100 may be changed to adapt to different environments by increasing and/or decreasing the number of modular units in group of modular units 108 assembled together to form platform 100.

The illustration of platform 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, modular unit 110 may include a set of secondary members in addition to set of adjustment members 128. This set of secondary members may be, for example, a set of braces used to provide additional support for set of support members 116. In some illustrative examples, structural element 138 of connection mechanism 134 may be connected to support member 120 instead of structure 114.

In other illustrative examples, adjustment member 128 may be configured to connect to more than one support member in set of support members 116. In these examples, adjustment member 128 may have one or more ends that are connected to second side 117 of structure 114 using one or more of set of connection mechanisms 136. Changing these one or more connections of adjustment member 128 to structure 114 may change the angle between structure 114 and all of the support members connected to adjustment member 128.

In still other illustrative examples, environment surface 106 of environment 102 may be a ceiling, a subfloor, or some other type of surface other than a floor of environment 102. When environment surface 106 is a subfloor, the set of support members for each modular unit in group of modular units 108 may be attached to fastening elements 148 such that platform 100 hangs from the subfloor.

Further, in these examples, the surface of structure 114 at second side 117 of structure 114 may be substantially planar in addition to or in place of surface 119 of structure 114 at first side 115 of structure 114 being substantially planar. In this manner, when platform 100 hangs from the subfloor, platform surface 150 may be formed by the surfaces of the second sides of the structures for group of modular units 108.

In some illustrative examples, environment surface 106 may not be substantially planar or substantially level. For example, in some cases, portions of environment surface 106 may be curved, angled, or raised, and/or different in some other manner relative to other portions of environment surface 106. Further, in these cases, fastening elements 148 may not be located in predefined locations on environment surface 106.

In these cases, the set of adjustment members for each modular unit in group of modular units 108 may be used to adjust the angle between one or more of the set of support members for each modular unit and the structure for each modular unit such that platform surface 150 formed by connecting group of modular units 108 together is substantially planar within selected tolerances. In particular, platform surface 150 may be substantially planar within selected tolerances even when platform surface 150 is not substantially parallel to environment surface 106. Fastening elements 148 may be used to attach the set of support members for each modular unit to environment surface 106 at locations based on the adjustment of the set of adjustment members for each modular unit.

Turning now to FIGS. 2-8, illustrations of a modular unit are depicted in accordance with an illustrative embodiment. In FIGS. 2-8, modular unit 200 is an example of one implementation for modular unit 110 in FIG. 1.

Figure 2:
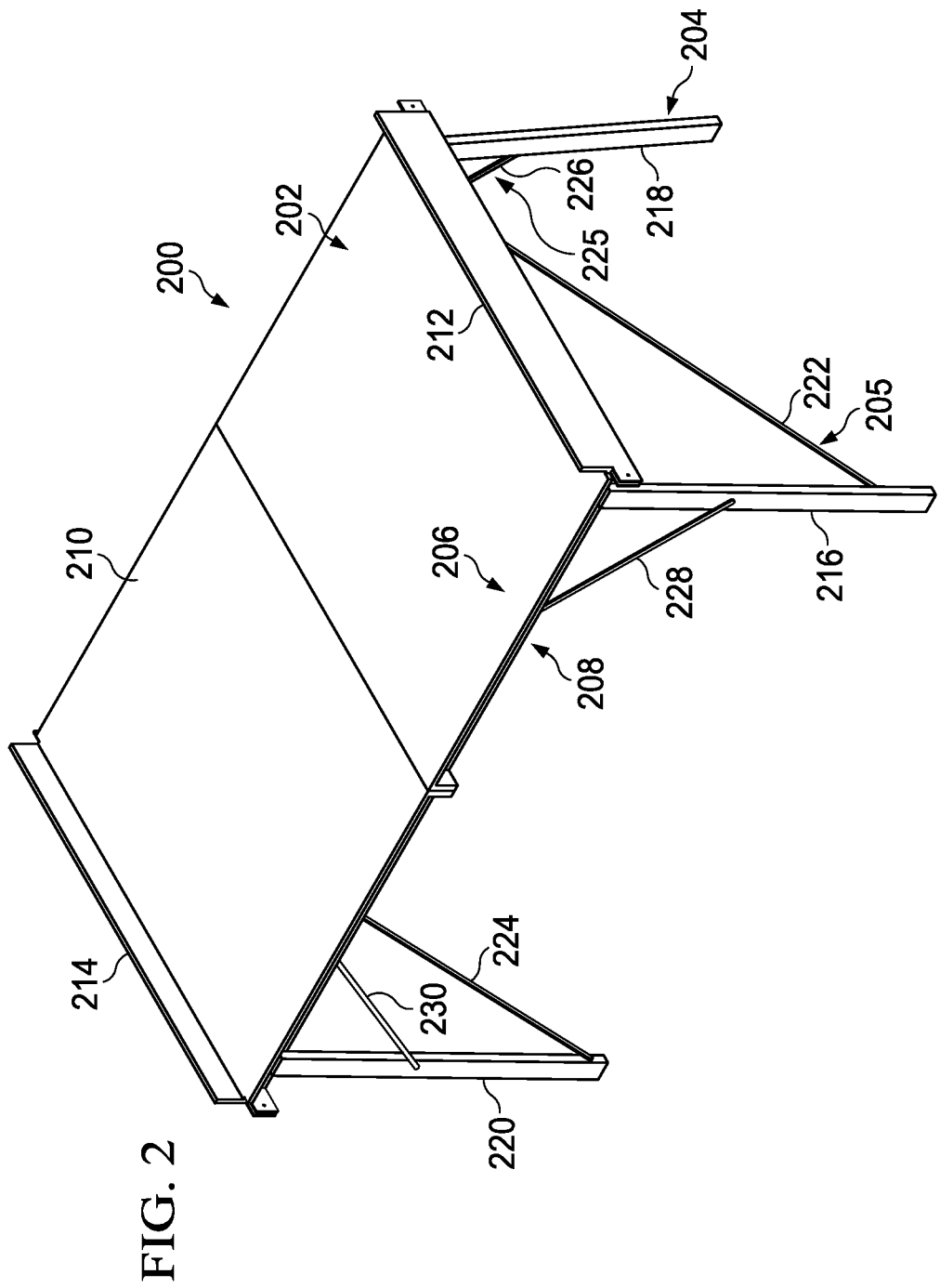
FIG. 2 is an illustration of a top isometric view of a modular unit in accordance with an illustrative embodiment.

With reference now to FIG. 2, an illustration of a top isometric view of modular unit 200 is depicted in accordance with an illustrative embodiment. As depicted, modular unit 200 comprises structure 202, set of support members 204, and set of braces 205.

Structure 202 is an example of one implementation for structure 114 in FIG. 1. Structure 202 has first side 206 and second side 208. In this illustrative example, surface 210 of structure 202 at first side 206 of structure 202 is substantially planar. Further, structure 202 includes structural element 212 and structural element 214 in this example.

Set of support members 204 is an example of one implementation for set of support members 116 in FIG. 1. Set of support members 204 is connected to structure 202 at second side 208 of structure 202. Set of support members 204 includes support member 216, support member 218, support member 220, and another support member (not shown in this view).

Further, set of braces 205 is an example of one implementation for set of adjustment members 118 in FIG. 1. Set of braces 205 includes brace 222 and brace 224. As depicted, brace 222 is connected to support member 216. Although not shown in this view, brace 222 is also connected to second side 208 of structure 202. Similarly, brace 224 is connected to support member 220. Although not shown in this view, brace 224 is also connected to second side 208 of structure 202.

In this illustrative example, modular unit 200 also includes set of secondary braces 225. Set of secondary braces 225 includes secondary brace 226, secondary brace 228, secondary brace 230, and another secondary brace (not shown in this view). In this manner, a secondary brace is attached to each of set of support members 204. Set of secondary braces 225 provide additional support for modular unit 200.

Figure 3:
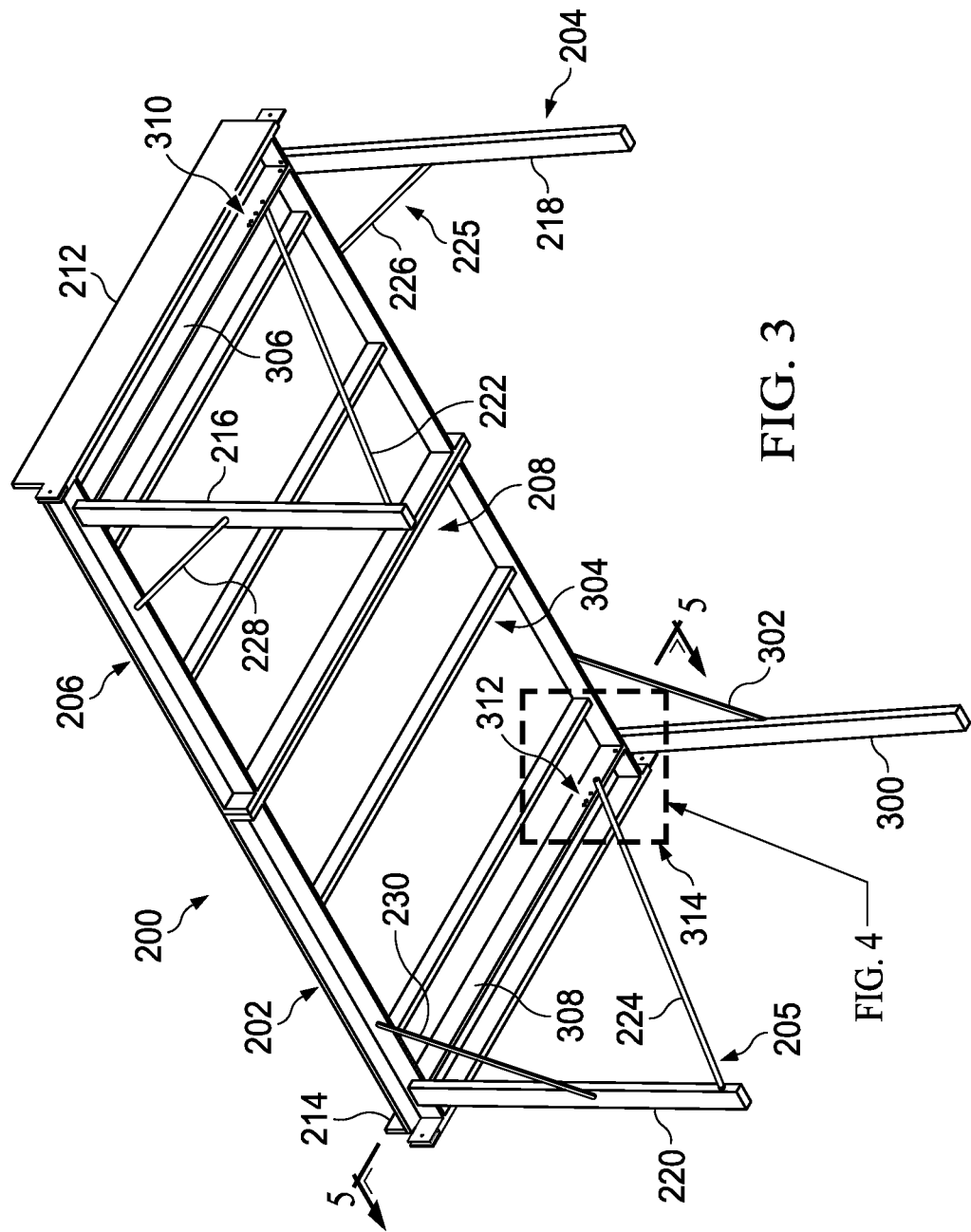
FIG. 3 is an illustration of a bottom isometric view of a modular unit in accordance with an illustrative embodiment.

With reference now to FIG. 3, an illustration of a bottom isometric view of modular unit 200 is depicted in accordance with an illustrative embodiment. In this illustrative example, support member 300 belonging to set of support members 204 is seen in this view. Further, secondary brace 302 belonging to set of secondary braces 225 is also seen in this view.

As depicted, structural elements 304 are associated with structure 202. In some cases, structural elements 304 may be considered part of structure 202. In this illustrative example, structural elements 304 include structural element 306 and structural element 308. Brace 222 is connected to structural element 306 using connection mechanism 310. Further, brace 224 is connected to structural element 308 using connection mechanism 312. Connection mechanism 310 and connection mechanism 312 are examples of one implementation for connection mechanism 134 in FIG. 1.

Structural element 306 and structural element 308 may be considered part of connection mechanism 310 and connection mechanism 312, respectively, in this illustrative example. In this manner, connection mechanism 310 is used to connect brace 222 to second side 208 of structure 202 and connection mechanism 312 is used to connect brace 224 to second side 208 of structure 202.

The connection between brace 224 and structure 202 is made within portion 314 of modular unit 200. Portion 314 of modular unit 200 and connection mechanism 312 are described in greater detail in FIG. 4 below.

Figure 4:
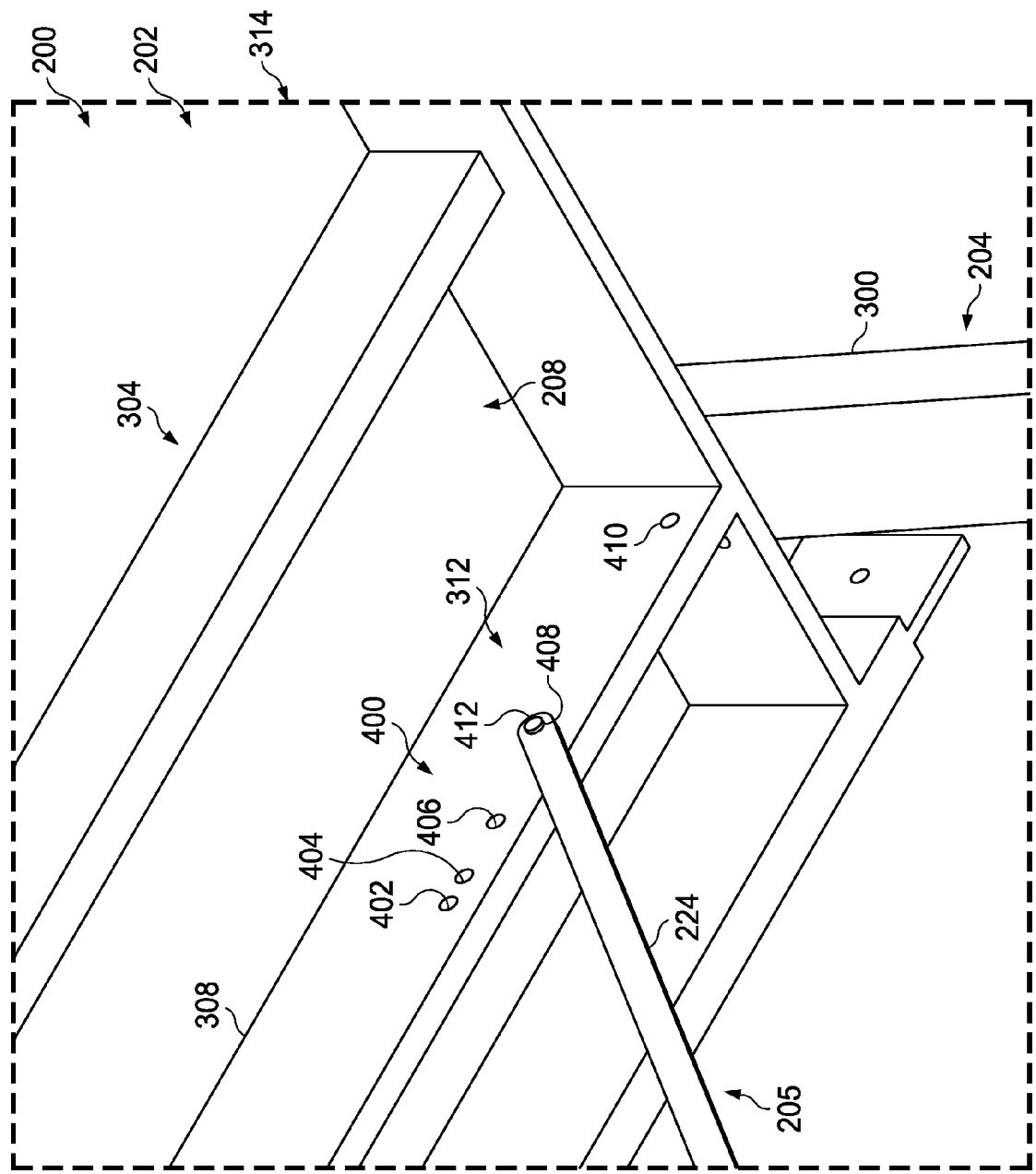
FIG. 4 is an illustration of an enlarged view of a portion of a modular unit in accordance with an illustrative embodiment.

With reference now to FIG. 4, an illustration of an enlarged view of portion 314 of modular unit 200 from FIG. 3 is depicted in accordance with an illustrative embodiment. In this illustrative example, connection mechanism 312 includes structural element 308 having holes 400 and fastener 412. Holes 400 include hole 402, hole 404, hole 406, hole 408, and hole 410.

Fastener 412 may be used to connect brace 224 to structural element 308 using one of holes 400. Changing which of holes 400 is used to connect brace 224 to structural element 308 changes the angle between support member 220 in FIG. 3 and structure 202.

Figure 5:
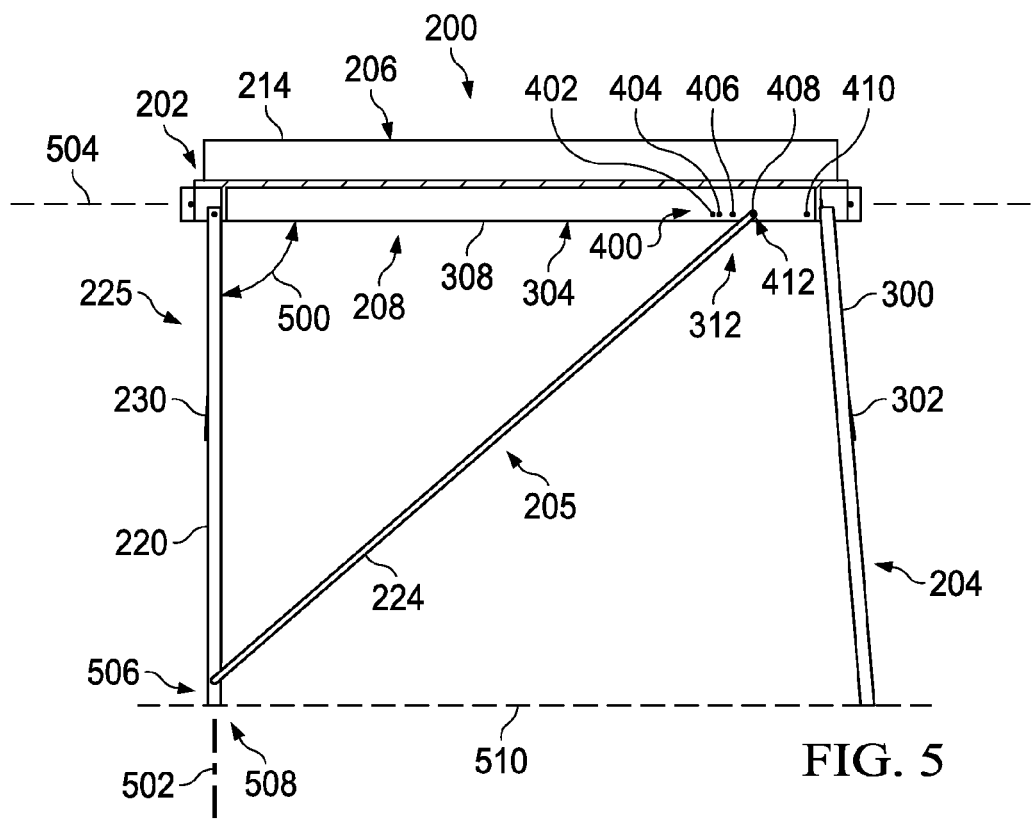
FIG. 5 is an illustration of a cross-sectional side view of a modular unit in accordance with an illustrative embodiment.

With reference now to FIG. 5, an illustration of a cross-sectional side view of modular unit 200 is depicted in accordance with an illustrative embodiment. In particular, in FIG. 5, a cross-sectional front view of modular unit 200 taken along lines 5-5 in FIG. 3 is depicted.

In this illustrative example, brace 224 has been connected to structural element 308 through hole 408. This connection connects brace 224 to structure 202. When brace 224 is connected to structure 202 through hole 408, angle 500 is formed between support member 220 and structure 202. In particular, angle 500 is formed between vertical axis 502 through support member 220 and plane 504 through structure 202. With angle 500, end 506 of support member 220 has position 508.

With angle 500 and end 506 of support member 220 at position 508, plane 504 through structure 202 may be at an angle relative to ground line 510. However, this angle may be within selected tolerances such that plane 504 through structure 202 is substantially parallel to ground line 510. Ground line 510 may be, for example, a representation of an environment surface on which modular unit 200 may be positioned.

Figure 6:
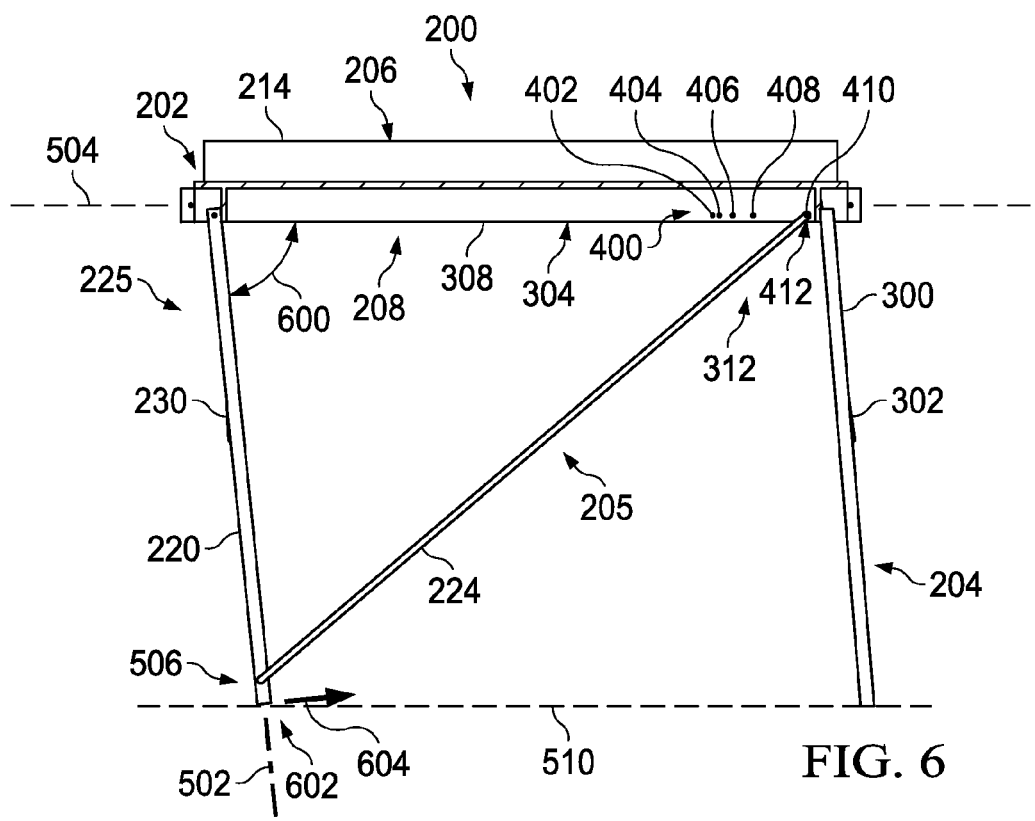
FIG. 6 is an illustration of a cross-sectional side view of a modular unit in accordance with an illustrative embodiment.

Turning now to FIG. 6, an illustration of a cross-sectional side view of modular unit 200 is depicted in accordance with an illustrative embodiment. In FIG. 6, the cross-sectional side view of modular unit 200 from FIG. 5 is depicted.

In this illustrative example, brace 224 has been connected to structural element 308 through hole 410. This connection connects brace 224 to structure 202. When brace 224 is connected to structure 202 through hole 410, angle 600 is formed between support member 220 and structure 202. In particular, angle 600 is formed between vertical axis 502 through support member 220 and plane 504 through structure 202.

Angle 600 is smaller than angle 500 in FIG. 5. With angle 600, end 506 of support member 220 has position 602. Position 602 is different from position 508 of end 506 of support member 220 in FIG. 5. In particular, position 602 of end 506 of support member 220 has been moved in the direction of arrow 604 relative to position 508 of end 506 of support member 220 in FIG. 5.

With angle 600 and end 506 of support member 220 at position 602, the angle of plane 504 through structure 202 with respect to ground line 510 in FIG. 6 may be different from the angle of plane 504 through structure 202 with respect to ground line 510 in FIG. 5. However, this difference may be within selected tolerances such that plane 504 through structure 202 remains substantially parallel to ground line 510.

Figure 7:
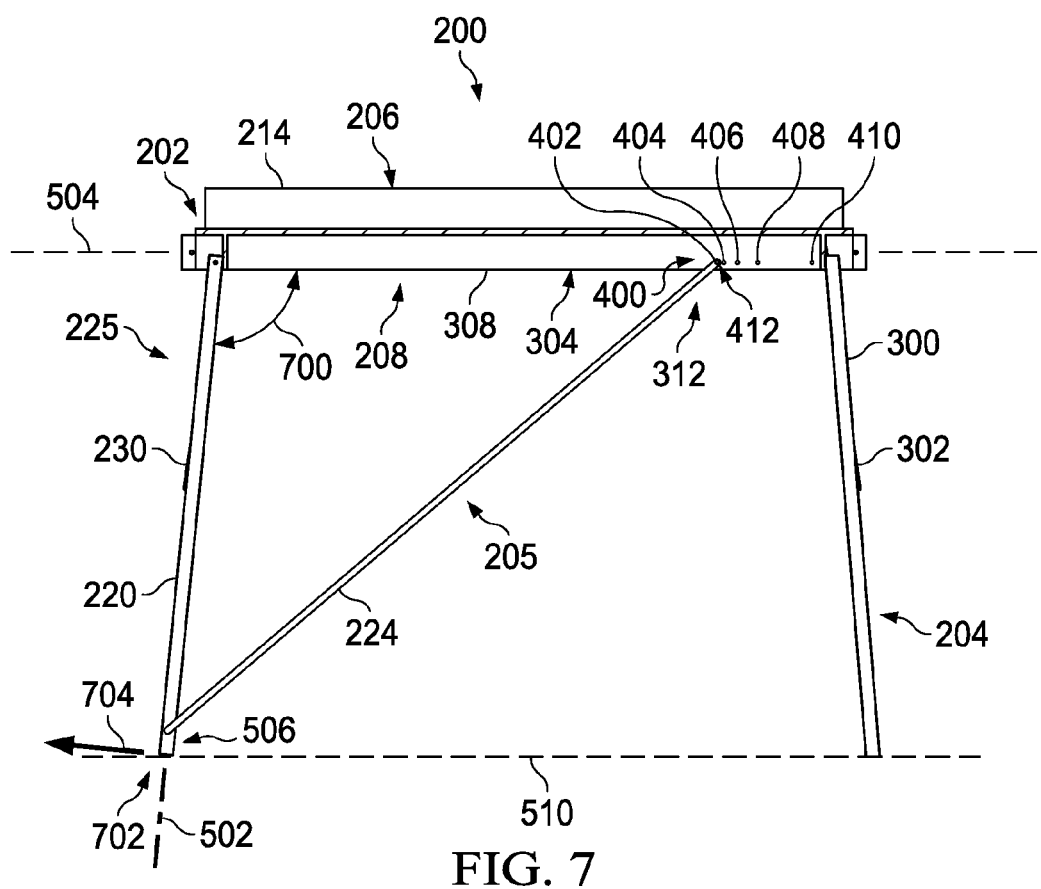
FIG. 7 is an illustration of a cross-sectional side view of a modular unit in accordance with an illustrative embodiment.

Turning now to FIG. 7, an illustration of a cross-sectional front view of modular unit 200 is depicted in accordance with an illustrative embodiment. In FIG. 7, the cross-sectional front view of modular unit 200 from FIG. 5 is depicted.

In this illustrative example, brace 224 has been connected to structural element 308 through hole 402. This connection connects brace 224 to structure 202. When brace 224 is connected to structure 202 through hole 402, angle 700 is formed between support member 220 and structure 202. In particular, angle 700 is formed between vertical axis 502 through support member 220 and plane 504 through structure 202.

Angle 700 is greater than angle 500 in FIG. 5. With angle 700, end 506 of support member 220 has position 702. Position 702 is different from position 508 of end 506 of support member 220 in FIG. 5. In particular, position 702 of end 506 of support member 220 has been moved in the direction of arrow 704 relative to position 508 of end 506 of support member 220 in FIG. 5.

With angle 700 and end 506 of support member 220 at position 702, the angle of plane 504 through structure 202 with respect to ground line 510 in FIG. 7 may be different from the angle of plane 504 through structure 202 with respect to ground line 510 in FIG. 5 or in FIG. 6. However, this difference may be within selected tolerances such that plane 504 through structure 202 remains substantially parallel to ground line 510.

Figure 8:
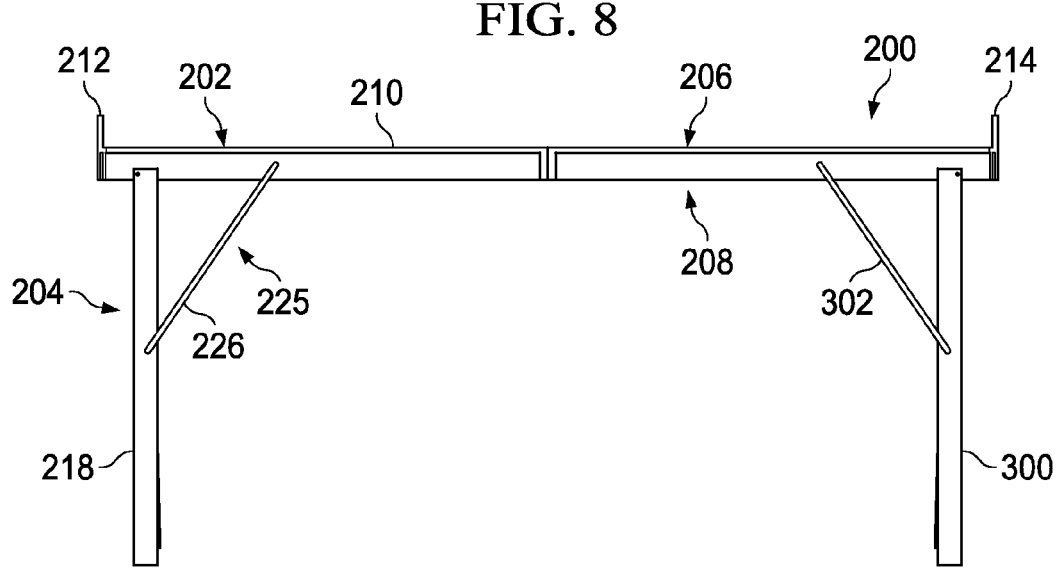
FIG. 8 is an illustration of a front view of a modular unit in accordance with an illustrative embodiment.

With reference now to FIG. 8, an illustration of a front view of modular unit 200 is depicted in accordance with an illustrative embodiment. In this illustrative example, set of secondary braces 225 may be more clearly seen.

Turning now to FIGS. 9-12, illustrations of two modular units connected together are depicted in accordance with an illustrative embodiment. In FIGS. 9-12, modular unit 200 is connected to modular unit 900. Modular unit 900 may be another example of an implementation for a modular unit in group of modular units 108 in FIG. 1.

With reference now to FIG. 9, an illustration of a top isometric view of two modular units connected to each other is depicted in accordance with an illustrative embodiment. In this illustrative example, modular unit 900 has been connected to modular unit 200 from FIGS. 2-8.

As depicted, modular unit 900 has a configuration similar to modular unit 200. For example, modular unit 900 comprises structure 902, set of support members 904, set of braces 905, and set of secondary braces 907. Structure 902 has first side 906 and second side 908. Surface 910 of structure 902 at first side 906 of structure 902 is substantially planar in this illustrative example. Structure 902 also includes structural element 912 and structural element 914.

In this illustrative example, set of support members 904 includes support member 916 and support member 918. As depicted, set of support members 904 includes two fewer support members than set of support members 204 for modular unit 200. Modular unit 900 may have had two additional support members (not shown in this view) that were physically removed from modular unit 900 prior to modular unit 900 being connected to modular unit 200. Of course, in other illustrative examples, these additional support members may be folded into a stowed position within modular unit 900 when not being used.

Further, set of braces 905 includes brace 920 and brace 922. Set of secondary braces 907 includes secondary brace 926 and secondary brace 928.

In this illustrative example, modular unit 900 and modular unit 200 are connected to each other to form a partially assembled platform. In particular, structural element 212 of modular unit 200 is connected to structural element 912 of modular unit 900 and structural element 214 of modular unit 200 is connected to structural element 914 of modular unit 900 to connect these two modular units. Additional modular units are needed to fully assemble the platform. Connection 924 at which structure 902 of modular unit 900 is connected to structure 202 of modular unit 200 is described in greater detail in FIG. 11 below.

Figure 10:
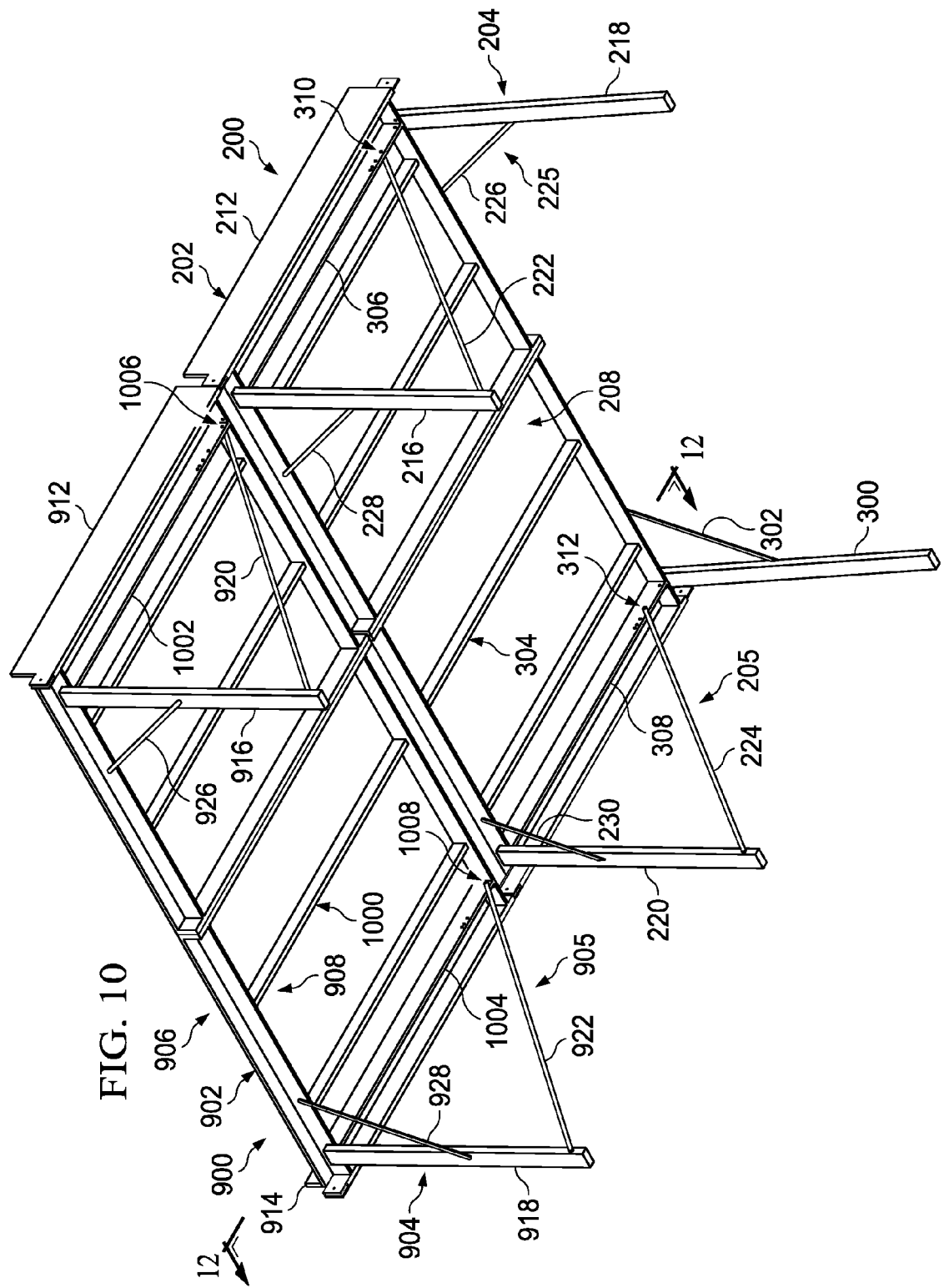
FIG. 10 is an illustration of a bottom isometric view of two modular units connected to each other in accordance with an illustrative embodiment.

With reference now to FIG. 10, an illustration of a bottom isometric view of two modular units connected to each other is depicted in accordance with an illustrative embodiment. In FIG. 10, structural elements 1000 are associated with structure 902 of modular unit 900.

Structural elements 1000 include structural element 1002 and structural element 1004. Brace 920 is connected to structural element 1002 using connection mechanism 1006. Brace 922 is connected to structural element 1004 using connection mechanism 1008.

Structural element 1002 and structural element 1004 are considered part of connection mechanism 1006 and connection mechanism 1008, respectively. Connection mechanism 1006 and connection mechanism 1008 are implemented in a manner similar to connection mechanism 310 and connection mechanism 312, respectively, for modular unit 200.

Figure 11:
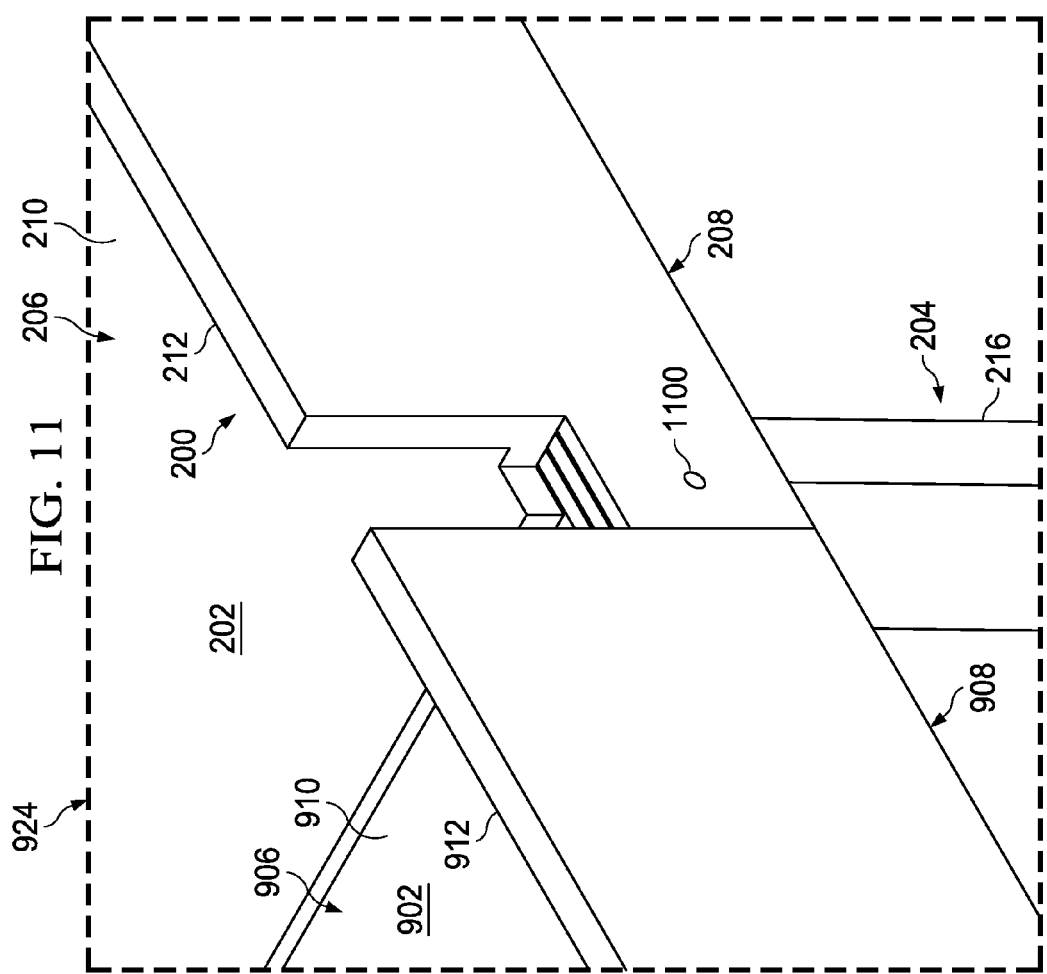
FIG. 11 is an illustration of an enlarged view of a connection between a modular unit and another modular unit in accordance with an illustrative embodiment.

Turning now to FIG. 11, an illustration of an enlarged view of connection 924 between modular unit 900 and modular unit 200 is depicted in accordance with an illustrative embodiment. As depicted, structural element 212 of modular unit 200 is connected to structural element 912 of modular unit 900. In particular, fastener 1100 is used to connect these two structural elements together.

Figure 12:
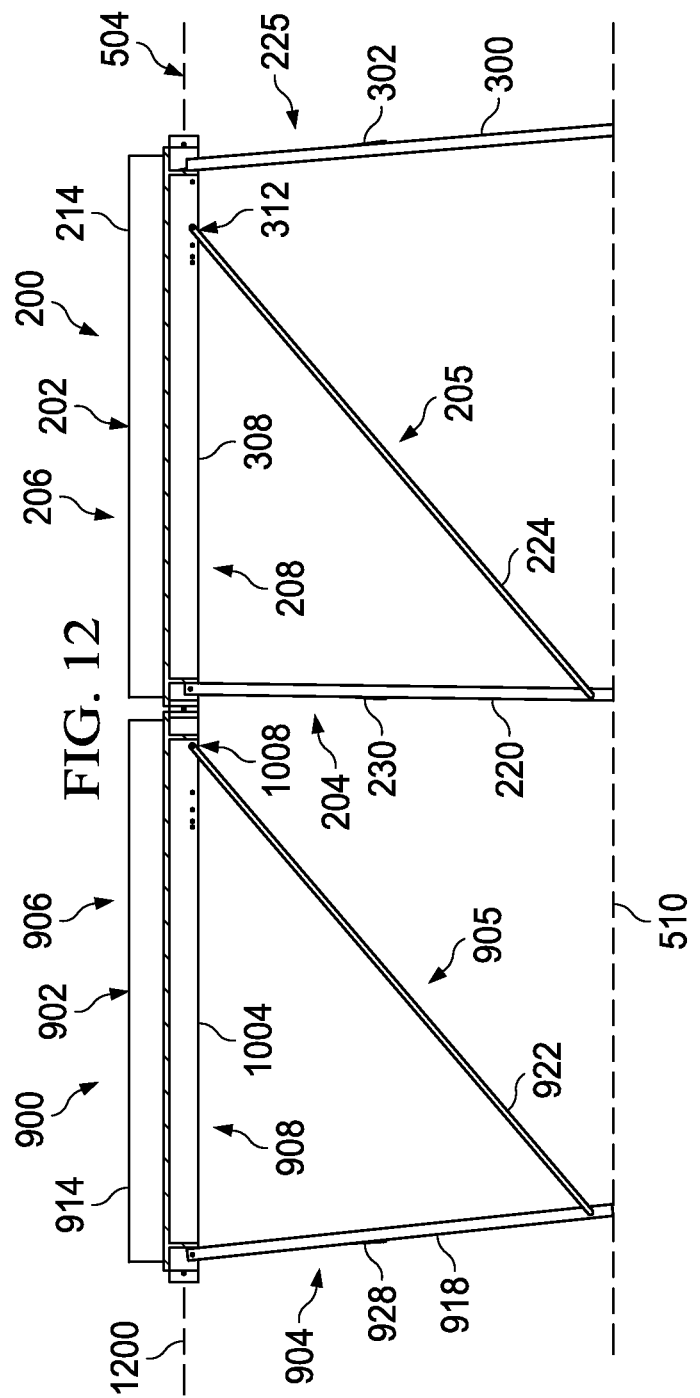
FIG. 12 is an illustration of a cross-sectional side view of two modular units connected to each other in accordance with an illustrative embodiment.

With reference now to FIG. 12, an illustration of a cross-sectional side view of two modular units connected to each other is depicted in accordance with an illustrative embodiment. In FIG. 12, a cross-sectional side view of modular unit 200 and modular unit 900 connected to each other taken along lines 12-12 in FIG. 10 is depicted.

As depicted, when modular unit 200 and modular unit 900 are connected together, plane 504 through structure 202 may have an angular offset relative to plane 1200 through structure 902. However, this offset may be sufficiently small such that plane 504 through structure 202 and plane 1200 through structure 902 may be substantially parallel to each other within selected tolerances. In other words, the offset may be negligible such that surface 214 of structure 202 and surface 914 of structure 902 form a substantially planar surface within selected tolerances.

Figure 13:
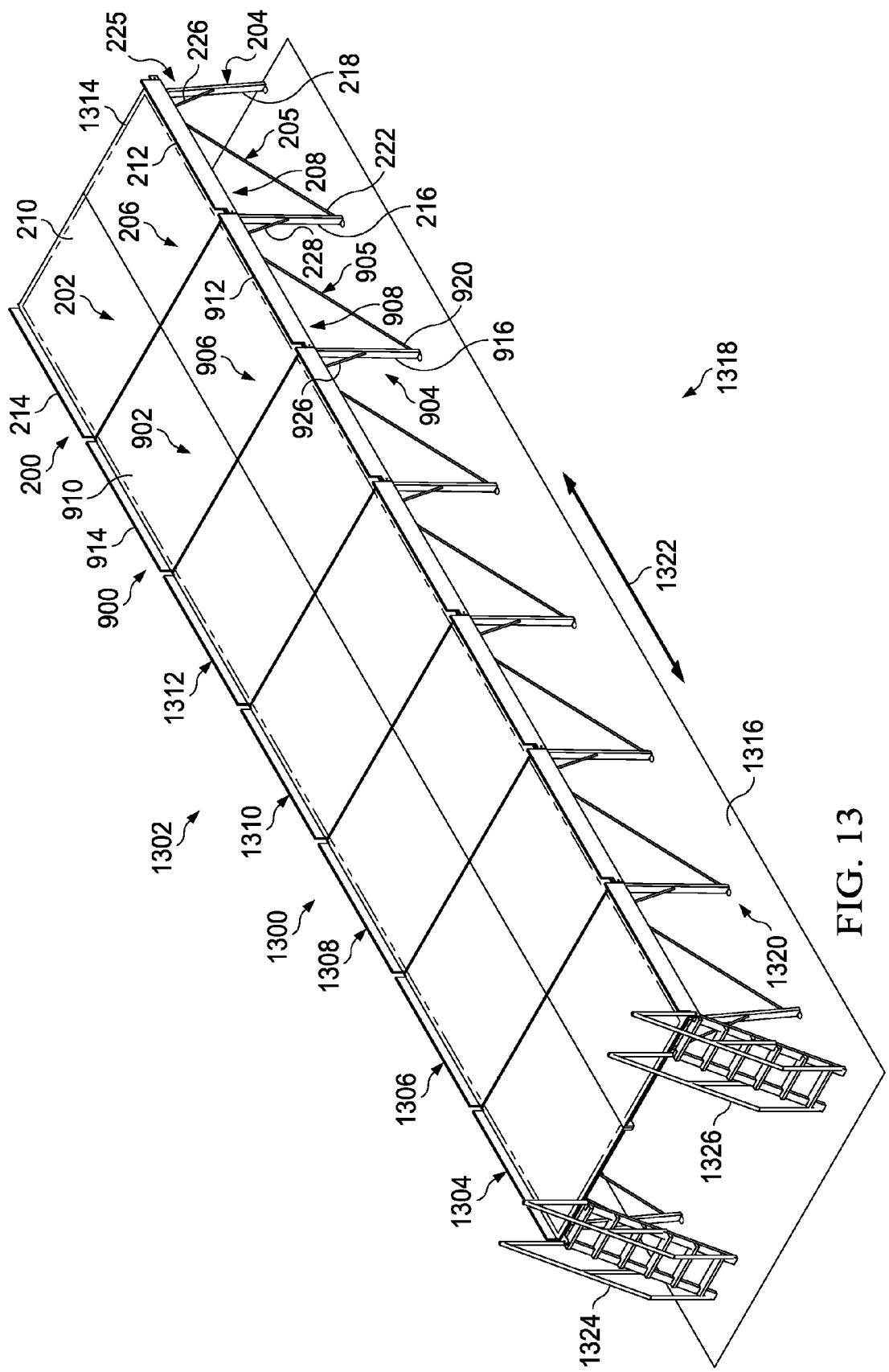
FIG. 13 is an illustration of a fully assembled platform in accordance with an illustrative embodiment.
Figure 14:
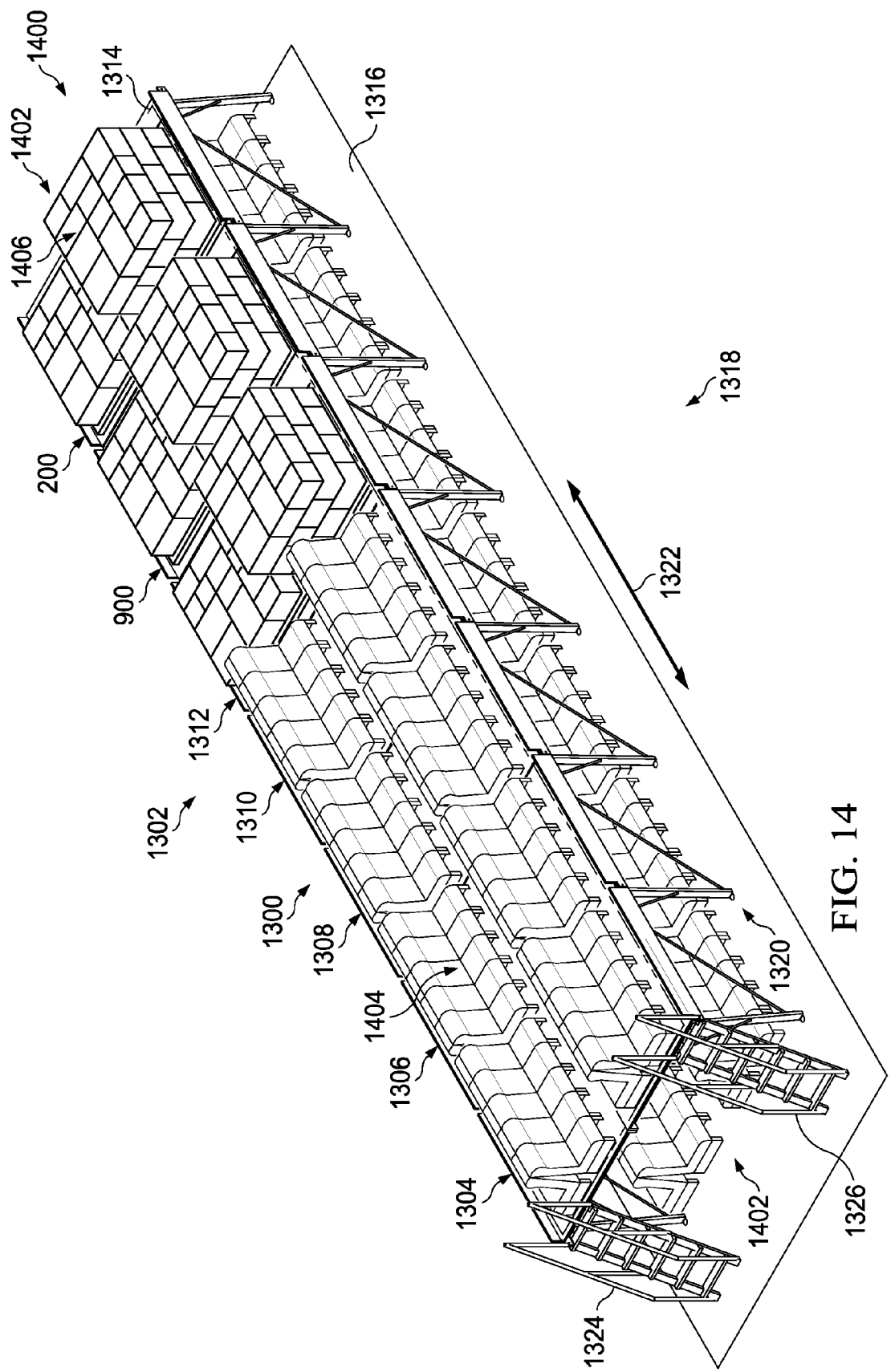
FIG. 14 is an illustration of a platform being used for additional seating within an environment in accordance with an illustrative embodiment.

Turning now to FIGS. 13-14, illustrations of a platform are depicted in accordance with an illustrative embodiment. In FIGS. 13-14, platform 1302 is formed by group of modular units 1300.

With reference now to FIG. 13, an illustration of a fully assembled platform is depicted in accordance with an illustrative embodiment. In FIG. 13, group of modular units 1300 have been connected to each other to form platform 1302. Group of modular units 1300 includes modular unit 200 from FIGS. 2-12, modular unit 900 from FIGS. 9-12, modular unit 1304, modular unit 1306, modular unit 1308, modular unit 1310, and modular unit 1312.

In this illustrative example, platform 1302 has been assembled on environment surface 1316 within environment 1318. Environment 1318 may be the interior of an aircraft in this example. Platform 1302 is attached to fastening elements 1320 on environment surface 1316. These fastening elements may be, for example, without limitation, tie-down rings.

In this illustrative example, the spacing of fastening elements 1320 on environment surface 1316 in the direction of axis 1322 may be unequal. Consequently, the different braces on the modular units in group of modular units 1300 are used to adjust the positions of the ends of the different support members on the modular units to accommodate the variably spaced fastening elements 1320. In particular, a position of an end of a support member may be adjusted such that the end is positioned is at a location of a fastening element.

As depicted, platform 1302 has platform surface 1314. Platform surface 1314 is substantially planar within selected tolerances. Platform surface 1314 provides a surface for transporting cargo and/or personnel in addition to environment surface 1316. For example, crew members of the aircraft may use ladder 1324 and/or ladder 1326 to reach platform surface 1314 to install additional seating on platform surface 1314 or store cargo on platform surface 1314.

Turning now to FIG. 14, an illustration of platform 1302 being used for additional seating and cargo within environment 1318 is depicted in accordance with an illustrative embodiment. As depicted, seating system 1400 has been installed in environment 1318. Seating system 1400 includes first group of seats 1402 and second group of seats 1404. First group of seats 1402 have been attached to environment surface 1316. Second group of seats 1404 have been attached to platform surface 1314 of platform 1302.

Further, platform 1302 is also used for storing cargo 1406. In particular, cargo 1406 has been placed on platform surface 1314.

Figure 15:
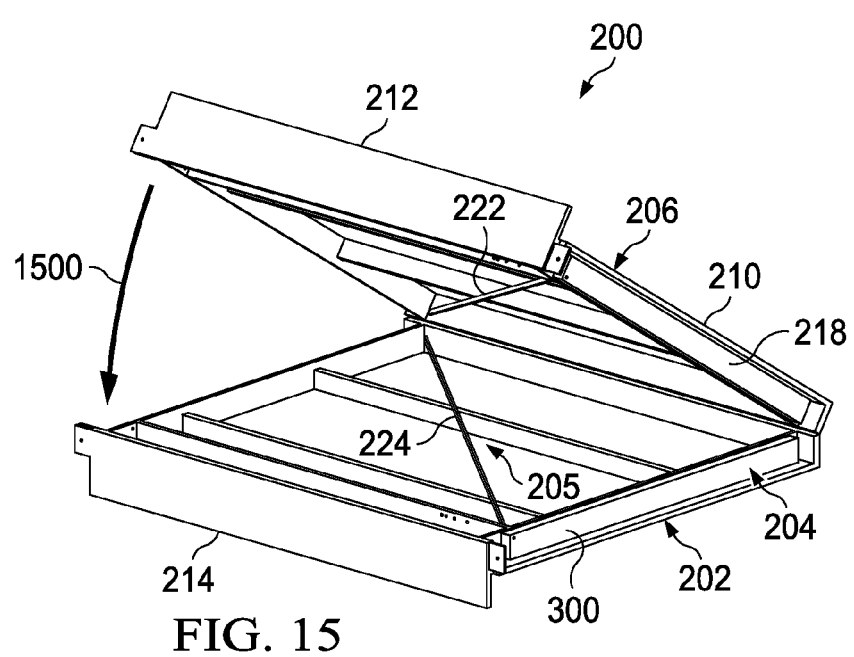
FIG. 15 is an illustration of a modular unit being folded into a compact configuration in accordance with an illustrative embodiment.

With reference now to FIG. 15, an illustration of modular unit 200 being folded into a compact configuration is depicted in accordance with an illustrative embodiment. As depicted, set of support members 204 may be folded into a stowed position within modular unit 200. Further, set of braces 205 and set of secondary braces 225 may also be folded into a stowed position within modular unit 200.

Modular unit 200 may be folded in the direction of arrow 1500 such that modular unit 200 has a compact configuration. This type of compact configuration may allow modular unit 200 and other similar modular units be more easily stored, moved, carried, and/or otherwise manipulated.

The illustrations of modular unit 200 in FIGS. 2-15, modular unit 900 in FIGS. 9-14, and platform 1302 in FIGS. 13-14 are not meant to imply physical or architectural limitations to the manner in which an illustrative embodiment may be implemented. Other components in addition to or in place of the ones illustrated may be used. Some components may be optional.

The different components shown in FIGS. 2-14 may be combined with components in FIG. 1, used with components in FIG. 1, or a combination of the two. Additionally, some of the components in FIGS. 2-14 may be illustrative examples of how components shown in block form in FIG. 1 can be implemented as physical structures.

Figure 16:
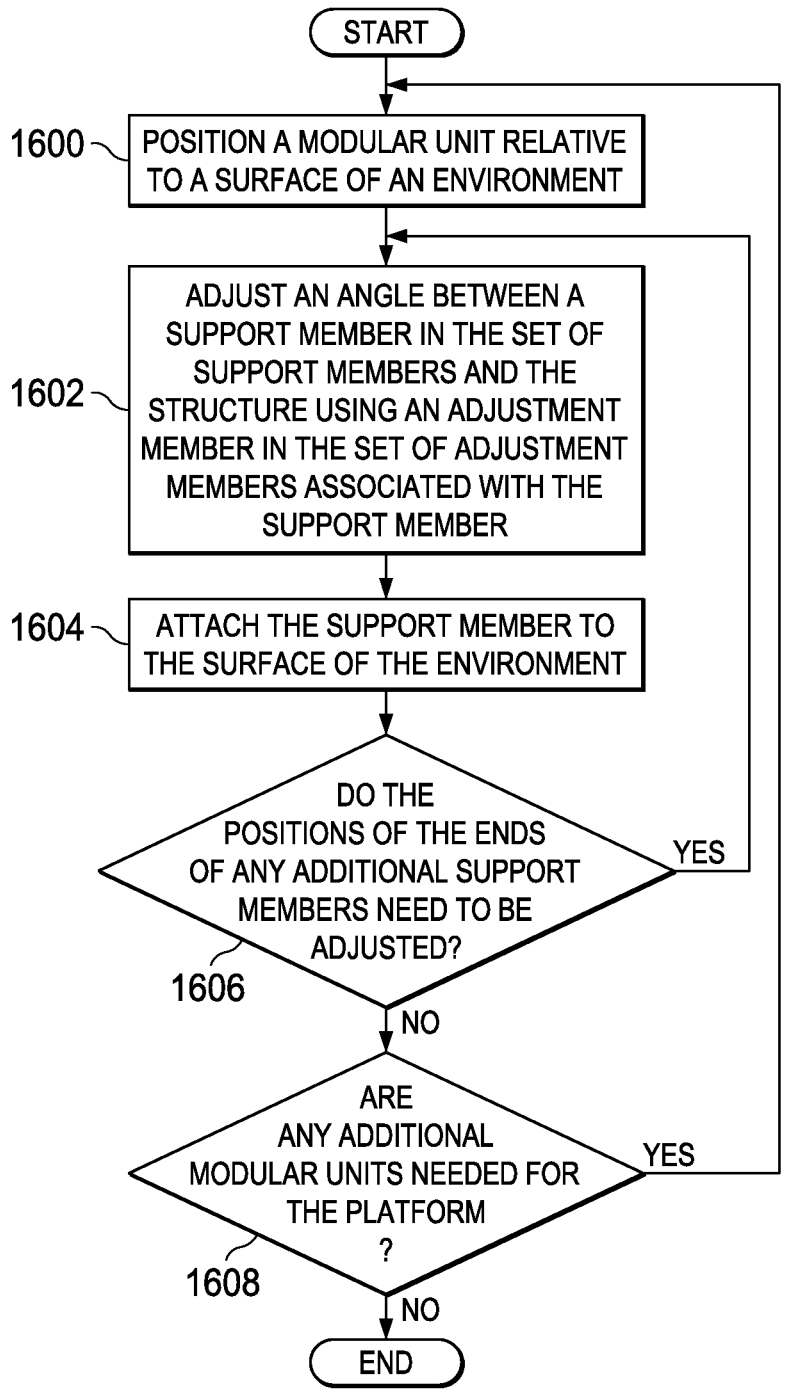
FIG. 16 is an illustration of a process for assembling a platform in accordance with an illustrative embodiment.

With reference now to FIG. 16, an illustration of a process for assembling a platform is depicted in accordance with an illustrative embodiment. The process illustrated in FIG. 16 may be performed to assemble a platform, such as, for example, platform 100 in FIG. 1 and/or platform 1302 in FIGS. 13-14.

The process begins by positioning a modular unit relative to a surface of an environment (operation 1600). The modular unit may be implemented using, for example, modular unit 110 in FIG. 1. The modular unit comprises a structure, a set of support members, and a set of adjustment members.

The process then adjusts an angle between a support member in the set of support members and the structure using an adjustment member in the set of adjustment members associated with the support member (operation 1602). Operation 1602 may be performed such that an end of the support member is positioned at the location of a fastening element on the surface of the environment. Further, operation 1602 may be performed using a connection mechanism, such as connection mechanism 134 in FIG. 1.

Thereafter, the process attaches the support member to the surface of the environment (operation 1604). The process then determines whether the positions of the ends of any additional support members need to be adjusted (operation 1606). If the positions of the ends of additional support members need to be adjusted, the process returns to operation 1602 as described above.

Otherwise, the process determines whether any additional modular units are needed for the platform (operation 1608). If additional modular units are not needed, the process terminates. Otherwise, the process proceeds to operation 1600 as described above.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft in the form of a block diagram is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. For example, platform 100 may be installed in aircraft 1800 during production, component and subassembly manufacturing 1706, during system integration 1708, while in service 1712, and/or during routine maintenance and service 1714. In particular, platform 100 may be installed in aircraft 1800 without requiring any modifications to the existing configuration or structure of aircraft 1800.

In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712 and/or during maintenance and service 1714 in FIG. 17. The use of a number of the different illustrative embodiments may substantially expedite the assembly of and/or reduce the cost of aircraft 1800.

Thus, the different illustrative embodiments provide a platform configured to provide an additional surface within the interior of a transport aircraft. In another illustrative embodiment, a platform comprises a group of modular units connected to each other and a platform surface. Each modular unit in the group of modular units comprises a structure, a set of support members associated with the structure, and a set of adjustment members. An adjustment member in the set of adjustment members is associated with a corresponding support member in the set of support members. The adjustment member is configured to adjust an angle between the corresponding support member and the structure. The platform surface is formed by the group of modular units and is substantially planar within selected tolerances.

In this manner, the different illustrative embodiments provide a platform configured to provide an additional surface without requiring changes to the existing configuration of the transport aircraft and/or changes to the structure of the transport aircraft. Further, the platform has adjustable support members that are configured to accommodate predefined locations for fastening elements that are variably spaced on the floor of an aircraft.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a structure;
a set of support members comprising a first support member and a second support member, each support member comprising a respective first end associated with, and directly rotatably connected to, the structure; and
a set of adjustment members comprising a first adjustment member and a second adjustment member, the first adjustment member being associated with and longer than the first support member, the second adjustment member being associated with and longer than the second support member, each adjustment member being linear and configured with a connected end and a fastened end, each connected end being directly connected to a corresponding support member near a second end of the corresponding support member, each fastened end configured to fasten into one hole of a plurality of holes in the structure, and each adjustment member configured to adjust an angle between the corresponding support member and the structure, in a range from acute through obtuse, such that each support member may support the structure.

2. The apparatus of claim 1, wherein the structure, the set of support members, and the set of adjustment members form a modular unit in which the modular unit is one of a group of modular units configured to form a platform.

3. The apparatus of claim 2, wherein the platform is configured for use in an environment in which each support member in the set of support members for each modular unit in the group of modular units is configured to be attached to an environment surface of the environment.

4. The apparatus of claim 3, wherein a platform surface formed by a surface of the structure for each modular unit in the group of modular units connected together to form the platform is substantially parallel to the environment surface within selected tolerances.

5. The apparatus of claim 1, wherein the structure comprises:
   a first side in which a surface of the structure at the first side of the structure is substantially planar; and
   a second side in which the set of support members is associated with the structure at the second side of the structure.

6. The apparatus of claim 1 further comprising:
   a set of connection mechanisms in which a connection mechanism in the set of connection mechanisms is configured to connect a corresponding adjustment member in the set of adjustment members to the structure.

7. The apparatus of claim 6, wherein the connection mechanism comprises:
   a structural element comprising the plurality of holes; and
   a number of fasteners configured to connect the corresponding adjustment member to the hole in the plurality of holes, wherein each hole in the plurality of holes corresponds to a different value for the angle between the structure and the corresponding support member with which the corresponding adjustment member is associated.

8. The apparatus of claim 6, wherein the connection mechanism comprises:
   a structural element having an opening;
   a sliding element configured to move in a direction along an axis within the opening of the structure, wherein a position of the sliding element within the opening of the structure determines the angle between the structure and the corresponding support member with which the corresponding adjustment member is associated; and
   a number of fasteners configured to connect the corresponding adjustment member to the sliding element.

9. The apparatus of claim 1, wherein the structure is a first structure, the set of support members is a first set of support members, and the set of adjustment members is a first set of adjustment members and further comprising:
   a second structure;
   a second set of support members associated with the second structure; and
   a second set of adjustment members in which a second adjustment member in the second set of adjustment members is associated with a second corresponding support member in the second set of support members and configured to adjust an angle between the corresponding support member and the second structure.

10. The apparatus of claim 9, wherein the first structure, the first set of support members, and the first set of adjustment members form a first modular unit in a group of modular units and the second structure, the second set of support members, and the second set of adjustment members form a second modular unit in the group of modular units and wherein modular units in the group of modular units are connected to each other to form a platform having a platform surface that is substantially planar within selected tolerances.

11. The apparatus of claim 10, wherein the platform is configured to support a number of objects placed on the platform surface of the platform.

12. The apparatus of claim 1, wherein the second end of at least one support member in the set of support members is configured to be attached to a corresponding fastening element on an environment surface of an environment.

13. The apparatus of claim 12, wherein the environment is selected from one of an interior of an aircraft, an interior of a space shuttle, an interior of a ship, an area on a deck of a ship, a storage space, and an interior of a container.

14. A platform comprising:
   a group of modular units connected to each other, wherein each modular unit in the group of modular units comprises:
   a structure;
   a set of support members comprising a first support member and a second support member, each support member comprising a respective first end associated with, and directly connected to, the structure;
   a set of adjustment members comprising a first adjustment member and a second adjustment member, the first adjustment member being associated with and longer than the first support member, the second adjustment member being associated with and longer than the second support member, each adjustment member being linear and configured with a connected end and a fastened end, each connected end being directly connected to a corresponding support member, near a second end of the corresponding support member, each fastened end configured to fasten into one hole of a plurality of holes in the structure, and each adjustment member configured to adjust an angle between the corresponding support member and the structure in a range from acute through obtuse, each support member configured to support the structure; and
   a platform surface formed by the group of modular units in which the platform surface is substantially planar within selected tolerances.

15. The platform of claim 14, wherein a modular unit in the group of modular units is configured to be connected to at least one other modular unit in the group of modular units.

16. The platform of claim 14, wherein a number of support members in the set of support members for a first modular unit in the group of modular units is different from number of support members in the set of support members for a second modular unit in the group of modular units.

17. A method for assembling a platform, the method comprising:
   positioning a modular unit relative to an environment surface of an environment, wherein the modular unit comprises a structure, a set of support members associated with the structure, and a set of adjustment members, such that the support members are directly and rotatably connected to the structure;
   adjusting an angle between a support member in the set of support members and the structure using an adjustment member in the set of adjustment members associated with the support member, the adjustment member being: linear and longer than the support member, and comprising a connected end and a fastened end, the connected end being directly connected to a corresponding support member, near a second end of the corresponding support member, the fastened end configured to fasten into one hole of a plurality of holes in the structure, the support member configured to support the structure, and each adjustment member configured to adjust an angle between the corresponding support member and the structure in a range from acute through obtuse; and attaching the support member to the environment surface of the environment.

18. The method of claim 17, wherein the step of adjusting the angle between the support member in the set of support members and the structure using the adjustment member in the set of adjustment members associated with the support member comprises:

adjusting the angle between the support member in the set of support members and the structure using the adjustment member in the set of adjustment members associated with the support member such that an end of the support member is positioned at a location of a fastening element on the environment surface of the environment.

19. The method of claim 18, wherein the step of adjusting the angle between the support member in the set of support members and the structure using the adjustment member in the set of adjustment members associated with the support member comprises:

adjusting the angle between the support member in the set of support members and the structure using the adjustment member in the set of adjustment members associated with the support member and a connection mechanism in which the connection mechanism is configured to connect the adjustment member to the structure.

20. The method of claim 17, wherein the modular unit is a first modular unit, the set of support members is a first set of support members, and the set of adjustment members is a first set of adjustment members and further comprising:

connecting a second modular unit to the first modular unit to form the platform, wherein the second modular unit comprises a second structure, a second set of support members associated with the structure, and a second set of adjustment members;

adjusting a second angle between a second support member in the second set of support members and the second structure using a second adjustment member in the second set of adjustment members associated with the support member in the second set of support members, wherein the platform has a platform surface that is substantially planar within selected tolerances; and attaching the support member in the second set of support members to the environment surface of the environment, wherein the platform surface is substantially parallel to the environment surface within selected tolerances.

* * * * *